United States Patent
Koshel

(10) Patent No.: US 10,385,551 B1
(45) Date of Patent: Aug. 20, 2019

(54) PLUMBING PROTECTOR

(71) Applicant: John J. Koshel, Winter Springs, FL (US)

(72) Inventor: John J. Koshel, Winter Springs, FL (US)

( * ) Notice: Subject to any disclaimer, the term of this patent is extended or adjusted under 35 U.S.C. 154(b) by 934 days.

(21) Appl. No.: 14/872,459

(22) Filed: Oct. 1, 2015

Related U.S. Application Data

(60) Provisional application No. 62/058,955, filed on Oct. 2, 2014.

(51) Int. Cl.
*E03B 7/09* (2006.01)
*F16L 55/07* (2006.01)

(52) U.S. Cl.
CPC .............. *E03B 7/09* (2013.01); *F16L 55/07* (2013.01)

(58) Field of Classification Search
CPC .................................. E03B 7/09; F16L 55/07
USPC ............................ 285/144.1–148.4, 242–259
See application file for complete search history.

(56) References Cited

U.S. PATENT DOCUMENTS

| 4,016,462 A | 4/1977 | Pavliny | |
| 4,589,688 A * | 5/1986 | Johnson | E03C 1/0403 285/12 |
| 5,060,689 A * | 10/1991 | Csaszar | F01N 3/30 137/512.15 |
| 5,375,887 A * | 12/1994 | Johnson | E03C 1/021 285/12 |
| 5,524,667 A | 6/1996 | Potter | |
| 7,174,921 B1 | 2/2007 | Wiltse | |
| 2010/0037977 A1* | 2/2010 | Rahimzadeh | F16L 55/115 138/96 R |
| 2015/0130184 A1* | 5/2015 | Filipczak | F16L 33/085 285/252 |

* cited by examiner

*Primary Examiner* — James M Hewitt, II
(74) *Attorney, Agent, or Firm* — Brian S. Steinberger; Brian S. Steinberger, P.A.

(57) ABSTRACT

Devices, apparatus, systems and methods for preventing lightning surges from entering metal plumbing, such as copper plumbing through the outside water hose valves, so as to eliminate pipe leaks caused by lightning strikes. To use the invention, the installer removes existing metal valves, and clamps a durable high temperature resistant non-conductive pressure rubber heater hose to the exposed exterior end of the copper piping. The other end of the hose is clamped to a reducer and a water control valve, such as a spigot. The assembly interrupts electrical surges from lightning from passing into the metal exterior valves on the sides of buildings and houses, which can damage the inside metal plumbing, such as the copper plumbing in the buildings and houses.

12 Claims, 4 Drawing Sheets

PLUMBING PROTECTOR

This application claims the benefit of priority to U.S. Provisional Patent Application Ser. No. 62/058,955 filed Oct. 2, 2014, which is incorporated by reference in its' entirety.

FIELD OF INVENTION

This invention relates to lightning protection, and in particular to devices, apparatus, systems and methods for preventing lightning surges from entering metal plumbing, such as copper plumbing through the outside hose valves to interrupt and eliminate pipe leaks caused by lightning strikes, by clamping a durable high temperature resistant rubber heater hose to both the exterior building opening to the water pipes, and an external hose valve.

BACKGROUND AND PRIOR ART

Lightning surges through outside metal hose valves on buildings are a known cause of pinhole leaks in the copper plumbing. The lightning surge striking an exterior metal hose valve has been known to surge throughout copper type metal water pipes, with the surge causing pinhole leaks in the plumbing pipes. The resulting leaks can cause water damage in surrounding walls, floors, ceilings and other property in the buildings.

Fixing the plumbing leaks can become very expensive. Since the homeowner may be forced to re-plumb parts of the entire house, to make costly repairs to the plumbing, drywall, cabinetry, wood flooring, ceiling, foundation, carpeting, and padding, that has been damaged by the leaks.

Adding a ground to the pipes does not prevent the lightning passing through the pipes to go to the grounded connection.

Thus, the need exists for solutions to the above problems.

SUMMARY OF THE INVENTION

A primary objective of the present invention is to provide devices, apparatus, systems and methods for preventing lightning surges from entering metal plumbing, such as copper plumbing through the outside hose valves, thereby virtually eliminating the occurrence of pinholes in the metal plumbing, such as copper plumbing that are the primary cause of leaks.

A secondary objective of the present invention is to provide devices, apparatus, systems and methods for preventing lightning surges from entering metal plumbing, such as copper plumbing through the outside hose valves, saving homeowners from having to re-plumb their entire house, or make costly repairs to the plumbing, drywall, cabinetry, wood flooring, foundation, carpeting, padding and the like, that result when the copper plumbing leaks.

A third objective of the present invention is to provide devices, apparatus, systems and methods for preventing lightning surges from entering metal plumbing, such as copper plumbing through the outside hose valves, by attaching a high temperature heater hose between the opening to the piping and the outside hose valve.

A preferred embodiment of the plumbing protection system, can include a pliable non-conductive hose having a first end and a second end, a first clamp for attaching the first end of the hose to an outlet water supply pipe of a building piping system, a water shut-off valve, and a second clamp for attaching the second end of the pliable hose to the water shut-off valve, wherein the plumbing protection system eliminates lightning surges from passing from the water valve into the water supply pipe of the building.

The pliable hose can be a 4" high temperature automotive rubber pressure heater hose having a diameter of approximately 5/8 inches.

The first clamp and the second clamp can each include stainless steel clamps, of approximately 9/16" to approximately 1.25" size The system can further include a threaded reducer attached between water valve and the second end of the pliable hose.

The reducer can include approximately 3/4" male hose threads with approximately 5/8" barbed fitting A plumbing protection kit can include a pliable non-conductive hose, a pair of adjustable clamps, a water shut-off valve, and a threaded reducer, wherein the kit is adapted to be assembled to connect to an exterior metal water pipe on a side of building to eliminate lightening surges from entering into the building via the exterior metal water pipe.

The pliable hose can be a 4" high temperature automotive rubber pressure heater hose having a diameter of approximately 5/8 inches.

The reducer can have approximately 3/4" male hose threads with approximately 5/8" barbed fitting.

The pair of clamps can be stainless steel clamps, of approximately 9/16" to approximately 1.25" size.

A method of protecting building piping systems, can include the steps of providing a pliable non-conductive hose having a first end and a second end, exposing a pipe outlet end on an exterior side of a building, clamping the first end of the hose to the building outlet end, and clamping a second end of the hose to a water valve, wherein lightning surges striking the water valve do not pass into the building piping system.

The exposing step can include the step of cutting off an existing water valve bib attached to an outlet end of a building piping system.

The method can further include the step of providing stainless steel clamps for the steps of clamping the first end of the hose and clamping the second end of the hose.

The pliable hose can be a high temperature auto pressure rubber heater hose.

The method can further include the steps of providing a threaded reducer, and attaching the threaded reducer between the second end of the hose and the water valve.

The invention interrupts electrical surges from lightning strikes entering into the existing outside water valves which are attached to metal piping, such as the copper piping throughout the building and house.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
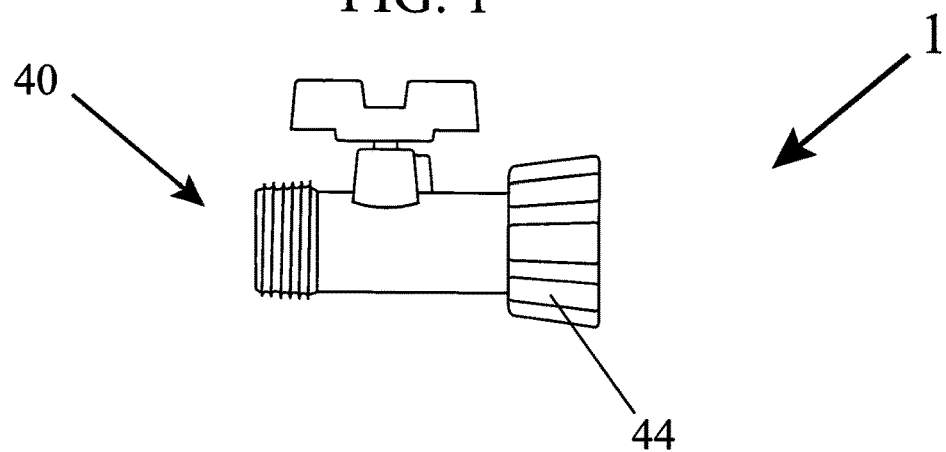
FIG. 1 is an exploded view of a plumbing protector assembly.
Figure 1:
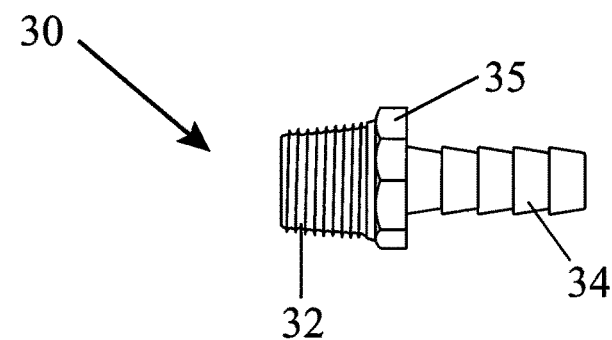
Figure 1:
Figure 1:
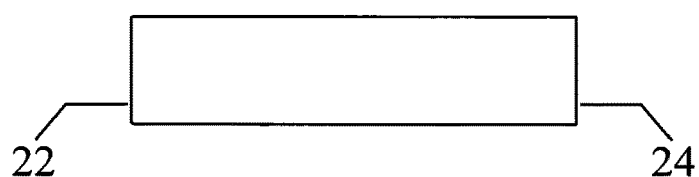
Figure 2:
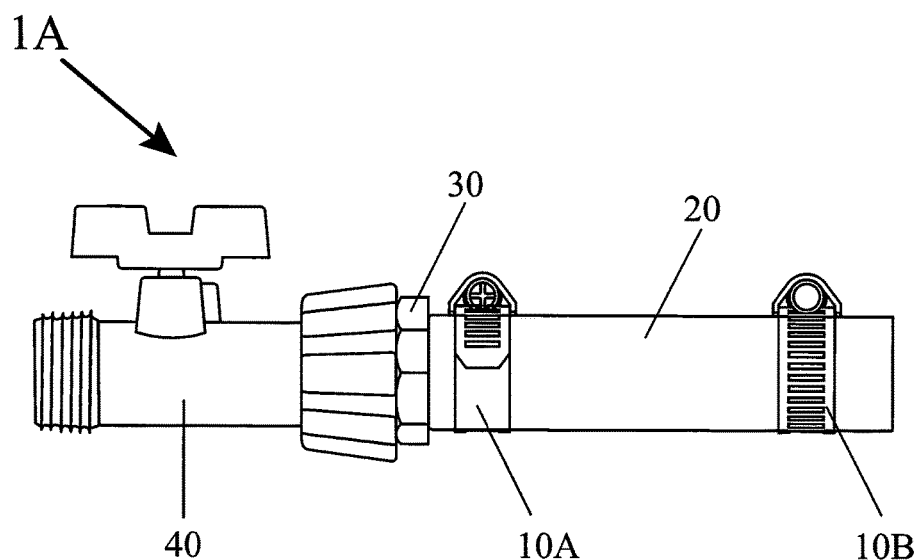
FIG. 2 is an assembled side view of the plumbing protector of FIG. 1.
Figure 3:
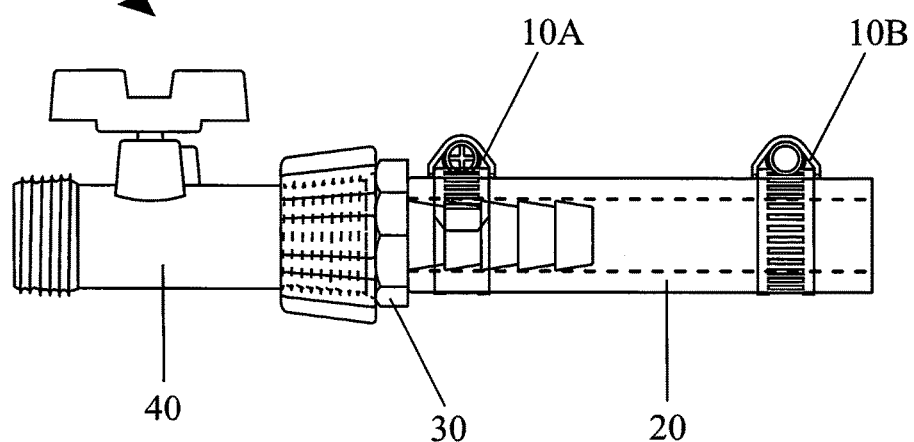
FIG. 3 is a partial cut-away view of the assembled plumbing protector of FIG. 1.
Figure 4:
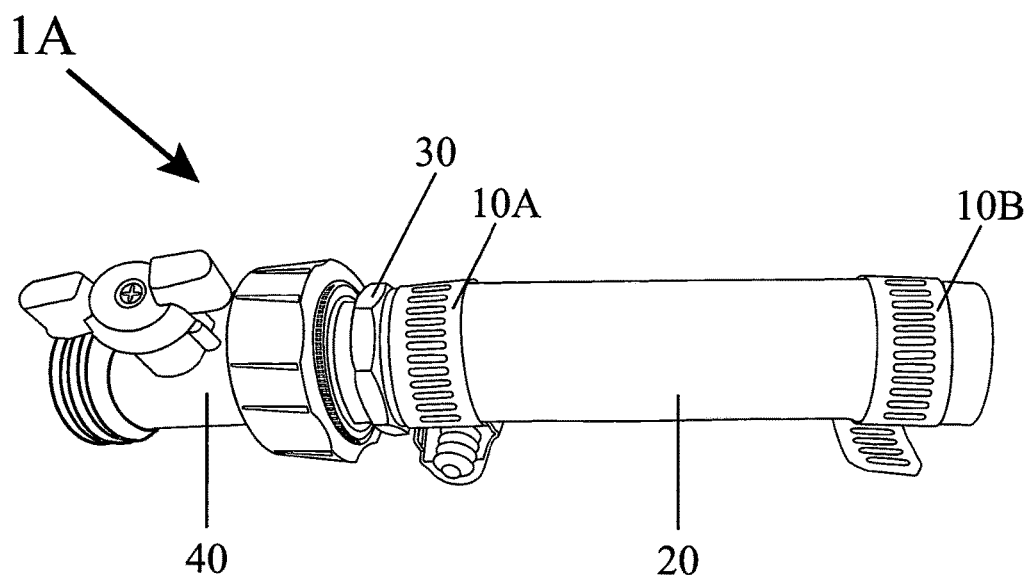
FIG. 4 is a perspective view of the assembled plumbing protector of FIG. 1.

A list of components will now be described.
1. Plumbing protector-Exploded View
1A Plumbing protector-Assembled View
10A First Clamp
10B Second clamp
20 hose
22 valve end of hose
24 free end of hose
30 Reducer
32 threaded end
34 insert end
35 enlarged mid-portion
40 Spigot shut off valve
44 Threaded socket end
50 Building
60 Water pipe extending out of building FIG. 1 is an exploded view of a plumbing protector assembly 1. FIG. 2 is an assembled side view of the plumbing protector 1A of FIG. 1. FIG. 3 is a partial cut-away view of the assembled plumbing protector 1A of FIG. 1. FIG. 4 is a perspective view of the assembled plumbing protector 1A of FIG. 1.

Referring to FIGS. 1-5, the plumbing protector 1, 1A, can include adjustable clamps 10A, 10B, can include but is but not limited to two stainless steel clamps, such as approximately 9/16" to approximately 1.25" size. A flexible non-conductive hose 20 can be used, such as but not limited to a rubber, plastic or other non-conductive material, such as but not limited to an approximately 4" length of high temperature, approximately 5/8" diameter automotive rubber pressure heater hose.

A preferred embodiment of the hose 20 can include but is not limited to a high temperature automotive pressure heater rubber hose has a temperature range of approximately 40 degrees F. to approximately 257 degrees F. Pressure rating is approximately 250 psi. The rubber hose 20 can be painted if desired to cosmetically match exterior of home or building. This type of hose has the durability to last well over time based on exterior hot and cold temperatures. The high-temperature automotive rubber hose can be used with the building metal, such as copper piping.

Plumbing protector 1, 1A, can include a reducer 30 to attach the hose 20 to the shut-off valve 40, and can include but is not limited to a threaded reducer, such as an approximately 3/4" male hose threads with approximately 5/8" barbed fitting, such as Ace Hardware part #72698. A shut-off valve 40 but is not limited to a turn-knob spigot valve. For example, such as valve can include such as but not limited to a brass water hose shut-off valve, such as Ace Hardware part #7082936, heavy duty brass body and ball valve.

Figure 5:
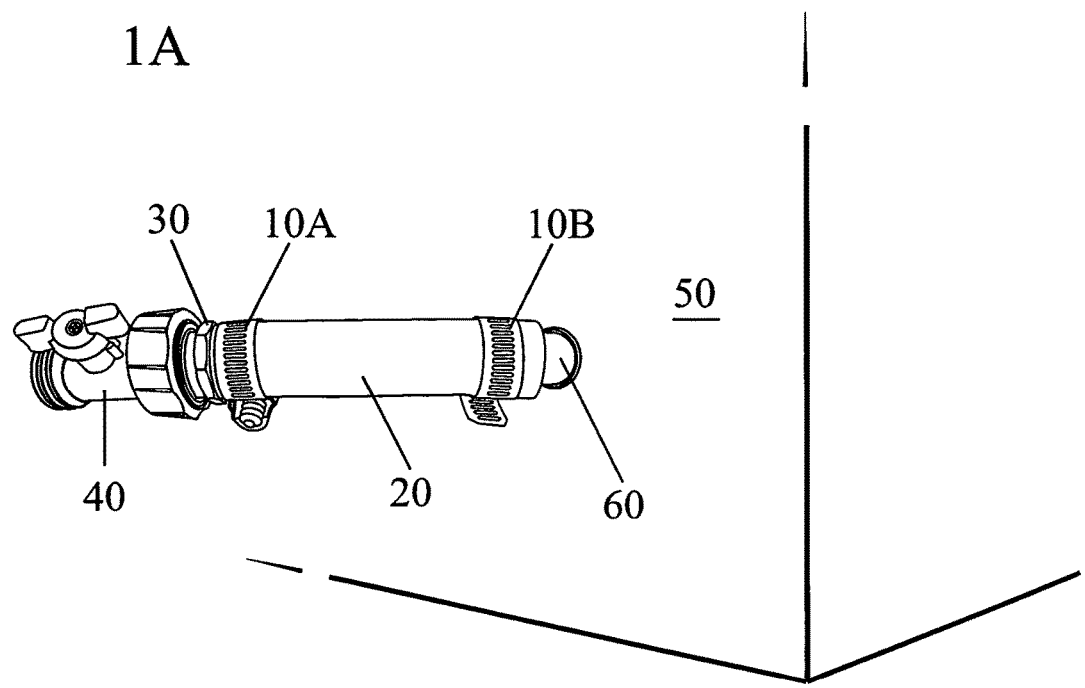
FIG. 5 is a perspective view of the assembled plumbing protector of FIG. 4 attached to a side spout pipe on a building.
Figure 6:
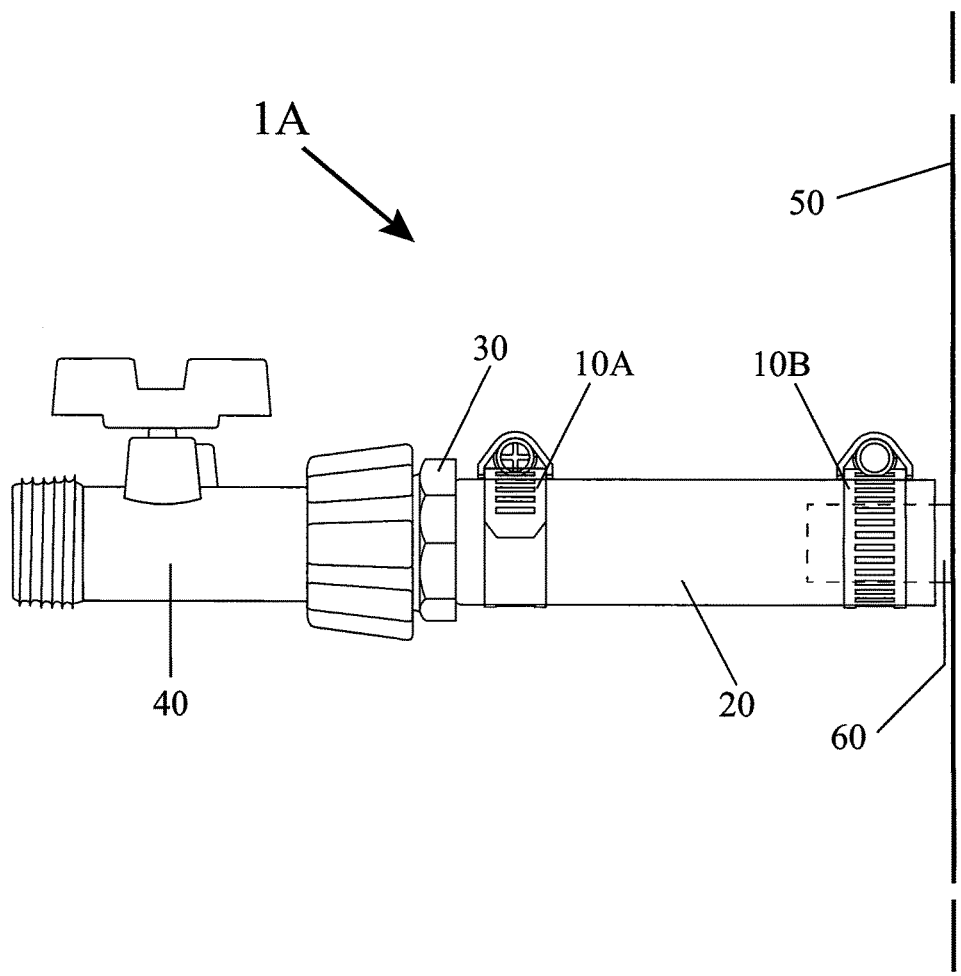
FIG. 6 is a side view of the assembled plumbing protector of FIG. 5 attached to the exterior pipe on a building.

FIG. 5 is a perspective view of the assembled plumbing protector 1A of FIG. 4 attached to a side metal spout pipe 60 on a building 50. FIG. 6 is a side view of the assembled plumbing protector 1A of FIG. 5 attached to the exterior metal pipe 60 on a building 50.

Referring to FIGS. 1-6, the invention can be sold in a fully pre-assembled state (FIGS. 2-4) in a cardboard box or plastic container where the installer can attach the one free end 24 of the hose 20 to an exposed outlet pipe 60 coming out from a building (which formerly had a hose valve either screwed on or soldered on its' place).

A preferred embodiment is an assembled invention consisting of five parts which include the valve, the reducer, the hose and two adjustable clamps.

Alternatively, the novel invention can be a kit of separate parts that the installer can assemble onsite. To assemble the plumbing protector 1, 1A, the installer can take the insert end 34 of the reducer 30 and insert it into end 22 of the hose 20 until the enlarged mid-plate rests against the hose end 22. A hose clamp 10A can be slid over the free end 24 of the hose 20 and tightened against the hose end 22 and insert end 34 of the reducer. Next the threaded socket end 44 of the shut-off valve 40 can be rotated about the threaded end 32 of the reducer 30 until it is tightened against the enlarged mid-portion 35 of the reducer.

During installation, the installer can cut off the existing outside water faucet (not shown) off of external pipe 60 by using a hacksaw or power saw where the existing water faucet is soldered or threadably screwed on to the copper piping.

The cutting needs to leave the exposed edge of the copper pipe preferably flared slightly to create a lip.

Next, the installer places one end 24 of the high temperature rubber heater hose 20 over the flared lip of the pipe 60 so that a portion of the hose 20 rests beyond the lip.

Next, one of the stainless steel clamps 10B can be slid back over the open end 24 of the hose 29 to fit over the portion of the hose end 24 placed beyond the flared lip edge of the pipe 60. The hose clamp 10B is then tightened down until a water tight seal is achieved.

The plumbing protector 1B is now ready to be used.

Additional plumbing protector assemblies can be attached to other exterior water valves and faucets of the building 50.

The invention interrupts electrical surges from lightning strikes entering into the existing outside water valves which are attached to metal piping, such as the copper piping throughout the building and house.

The inventor has tested three units that were installed over a 20 year period. To date the plumbing protector has 100% success in preventing leaks, of both the copper plumbing and outside valves.

While an approximately 4" long high temperature automotive rubber pressure heater hose has been described, other sizes of hoses both larger and slightly smaller sizes can be used.

Although the preferred embodiment describes the invention for use with copper piping, the invention can be used with other types of metal piping, such as lead and steel piping and the like.

The term "approximately" can be +/− 10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A plumbing protection system, consisting of:
    a pliable non-conductive hose having a diameter of approximately 5/8", and temperature operating range of approximately 40 F to approximately 257 F, with a first end and a second end;
    a first clamp for attaching the first end of the hose to an outlet water supply pipe of a building piping system, the first clamp having a diameter of approximately 9/16" to approximately 1.25";
    a water shut-off valve;
    a second clamp for attaching the second end of the pliable hose to the water shut-off valve, the second clamp having a diameter of approximately 9/16" to approximately 1.25"; and
    a threaded reducer attached between the water shut-off valve and the second end of the pliable hose, the threaded reducer having male hose threads with a diameter of approximately 3/4" male hose threads and a barbed fitting having a diameter of approximately 5/8", wherein the plumbing protection system eliminates lightning surges from passing from the water valve into the water supply pipe of the building.

2. The plumbing protection system of claim 1, wherein the pliable hose is an automotive rubber pressure heater hose.

3. The plumbing protection system of claim 1, wherein the first clamp and the second clamp are each stainless steel clamps.

4. The plumbing protection system of claim 1, wherein the rubber hose has a length of approximately 4" long.

5. The plumbing protection system of claim 4, wherein the first clamp and the second clamp are each stainless steel clamps.

6. A plumbing protection kit, consisting of:
    a pliable non-conductive hose having a diameter of approximately 5/8", and temperature operating range of approximately 40 F to approximately 257 F;
    a pair of adjustable clamps, each of the clamps having a diameter of approximately 9/16" to approximately 1.25" one of the clamps for attaching a first end of the hose to an outlet water supply pipe of a building piping system;
    a water shut-off valve, another of the clamps for attaching a second end of the pliable hose to the water shut-off valve; and
    a threaded reducer attached between the water shut-off valve and the second end of the pliable hose, the threaded reducer having male hose threads with a diameter of approximately 3/4" male hose threads and a barbed fitting having a diameter of approximately 5/8", wherein the kit is adapted to be assembled to connect to an exterior metal water pipe on a side of building to eliminate lightening surges from entering into the building via the exterior metal water pipe.

7. The plumbing protection kit of claim 6, wherein the pliable hose is rubber heater hose having a length of approximately 4" long.

8. The plumbing protection kit of claim 6, wherein the pair of clamps are each stainless steel clamps.

9. A method of protecting building piping systems, consisting of the steps of:
    providing a pliable non-conductive hose having a first and second ends, the pliable hose having a diameter of approximately 5/8", and temperature operating range of approximately 40 F to approximately 257 F;
    providing a first clamp and a second clamp, each clamp having a diameter of approximately 9/16" to approximately 1.25";
    providing a water shut-off valve;
    providing a threaded reducer having male hose threads with a diameter of approximately 3/4" male hose threads and a barbed fitting having a diameter of approximately 5/8";
    exposing a metal pipe outlet end on an exterior side of a building;
    clamping the first end of the pliable hose to the building outlet end with the first clamp; and
    clamping a second end of the pliable hose to the water valve with the second clamp; and
    attaching the threaded reducer between the water shut-off valve and the second end of the pliable hose, wherein lightning surges striking the water valve do not pass into the building piping system.

10. The method of claim 9, wherein the exposing step includes the step of:
    cutting off an existing water valve bib attached to the metal outlet end of a building piping system.

11. The method of claim 9, wherein the step of providing the first clamp and the second clamp includes the steps of:
    providing stainless steel clamps.

12. The method of claim 9, wherein the pliable hose is a rubber heater hose having a length of approximately 4" long.

* * * * *